United States Patent Office 2,907,999
Patented Oct. 6, 1959

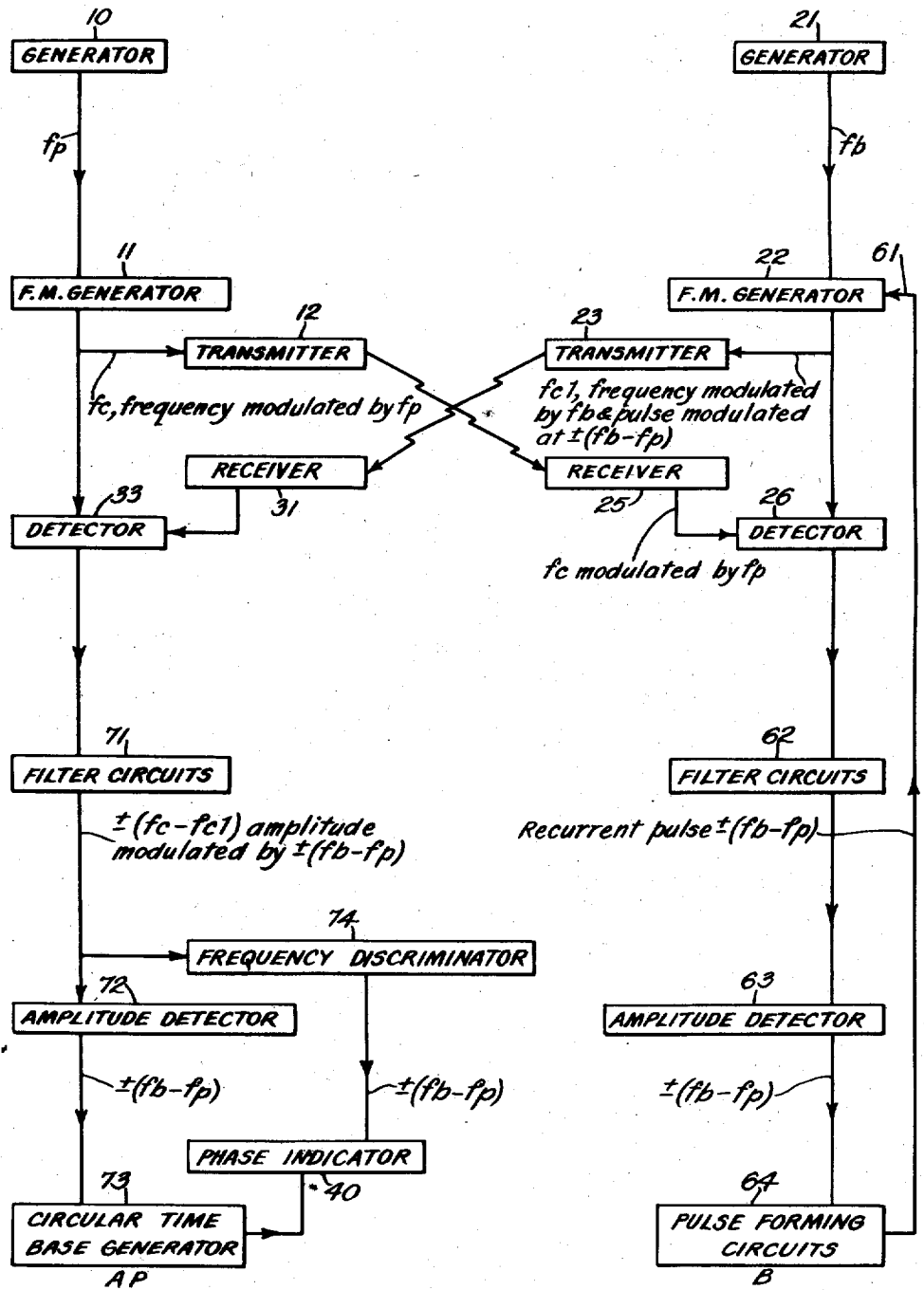

2,907,999

DETERMINING RELATIVE POSITION BY MEANS OF TRANSIT TIME OF WAVES

Trevor Lloyd Wadley, Johannesburg, Transvaal Province, Union of South Africa, assignor to South African Council for Scientific and Industrial Research, Pretoria, Union of South Africa Application November 13, 1956, Serial No. 621,903

Claims priority, application Union of South Africa November 15, 1955

5 Claims. (Cl. 343—12)

This invention relates to a method or system for aiding in navigation, surveying or tracking by which information useful for determining the locus of a point P relative to other points A and B or the relative position of the points A, B and P, including the case where point P is coincident with A, is obtained by means of the wave transit times between the various points.

A number of such systems are already known. In the simplest form of such a system a continuous wave of a first frequency $fp$ is radiated from point A to point B and is then reflected or relayed to point P, where, by examination of its manner of interference with the first wave received directly from point A, a measure of the difference in transit times of the waves arriving at point P is obtainable and hence a measure of the locus of point P relative to points A and B may be made. In this case the frequency $fp$ may be referred to as the pattern frequency of the system.

With the simple system referred to above, difficulty may well be experienced in detecting the wave from one point, e.g. point B, in the presence of the other wave, e.g. the wave from point A, as one may be considerably stronger than the other. It has been proposed to eliminate this difficulty by radiating waves which are of different but harmonically related frequencies from the points A and B and then comparing these separate waves at point P at some common multiple of their respective frequencies. In this case the common multiple is the pattern frequency of the system.

In a further known system it has been proposed to radiate a measuring frequency $fp$ from point A and a measuring frequency $fb$ from point B. The beat which exists between the frequencies $fp$ and $fb$ at point B and the beat between these frequencies as received from points A and B at point P are compared and the phase difference between these beats is the measure required. In an extension of this system it has also been proposed to transmit the beat existing at B to P as an amplitude modulation of a wave of frequency $fb$.

The drawback of the last discussed systems is that while the measuring frequencies $fp$ and $fb$ may be ideal for measuring purposes, e.g. to give beats to act upon a measuring device such as a phase meter, these waves may not be ideally suited for propagation between the various points. If waves suitable for propagation are chosen, they may not be useful for measuring purposes.

An object of the invention is to provide a system in which the propagation difficulties are eliminated and in which suitable pattern frequencies may be employed.

According to the invention two measuring frequencies are modulated on to a carrier wave for transmission from points A and B respectively, two comparison frequencies are derived by heterodyning each of the modulated carrier waves transmitted from points A and B either with the other modulated carrier wave or with the measuring frequency at which the other carrier wave is modulated, one comparison frequency being derived at P, and the phases of the comparison frequencies so derived are compared.

The carrier waves may be amplitude, phase or frequency modulated or two waves of different frequency, the difference constituting the pattern frequency, may together constitute the carrier wave. In this specification and in the appended claims when "modulation" is spoken of in general terms all these processes by which a measuring frequency may be transmitted from one point to another without being propagated on its own, as well as processes which provide a side band on a carrier in a form suitable to be detected at other points, are included.

As said above, one comparison frequency must be derived at P. The second comparison frequency may be derived at B or P.

The comparison point may be situated anywhere, but for convenience sake comparison usually takes place at P. In this case where the second comparison frequency is derived at P, that frequency is preferably transmitted to P as a modulation on the modulated carrier wave being transmitted from B. Alternatively a combination of the measuring frequencies may be derived at B and modulated upon the carrier at B, in which case both measuring frequencies are derived at P.

It is a feature of the invention that the measuring frequencies are modulated upon separate carrier waves. Preferably they are frequency modulated on the carrier waves and the comparison frequency derived at B is communicated as a pulse frequency modulation on the carrier wave provided for the measuring frequency from B.

The invention is described hereunder by way of illustration and example with reference to the accompanying drawings, in which The figure is a block diagram of a preferred embodiment of the invention.

A preferred embodiment of the invention is shown in the figure. In this embodiment the point P is coincident with point A so that the resultant arrangement serves to measure the distance A—B.

At the common point, AP, a first wave generator 10 provides a first wave frequency $fp$ of suitable value, e.g. 10 mc./s. This first wave is applied as a modulation control input to a frequency modulated wave generator 11 having a centre frequency $fc$ of any suitable value, for instance 3000 mc./s. The resultant wave output of $fc$ frequency modulated by $fp$ is radiated by means of wave transmitter 12 to the point B and is also applied as one input of a detector circuit 33 which will be referred to later.

At the point B a second generator 21 provides a second wave frequency $fb$ of suitable value different from $fp$, e.g. 9.999 mc./s. This second wave frequency $fb$ is applied as the modulation control input of a further frequency modulated wave generator 22 operating with a centre frequency $fc1$ of suitable value different from $fc$, for instance 3033 mc./s. This generator 22 is, however, also provided with a further modulation control input 61 by which a pulse modulation can be superimposed upon the main frequency modulated output. The output from the generator 22 is radiated by means of wave transmitter 23 to point AP as a wave of frequency $fc1$ frequency modulated by frequency $fb$ and is also applied to a detector circuit 26. This detector circuit, which is of linear or quadratic type, is also supplied through wave receiver 25 with the received wave from point A, i.e. at frequency $fc$ modulated by frequency $fp$ whereby an output including a component of frequency $\pm (fc-fc1)$ amplitude modulated by the frequency $\pm (fb-fp)$ is provided. With the numerical examples given, this output wave component is one of 33 mc./s. amplitude modulated a 1 kc./s. This particular output wave is selected by means of the filter circuits 62 and applied to an amplitude detector 63 which serves to select 1 kc./s. modulation component of $\pm (fb-fp)$ which is then applied to pulse forming circuits 64, the resultant output pulses from which, occurring at a predetermined instance in each cycle of the modulation frequency $\pm (fb-fp)$, are then fed back to the modulated wave generator 22 as the second modulation control at input 61 already mentioned. The final output from the wave transmitter 23 radiated from point B to point AP is accordingly a wave of frequency $fc1$ frequency modulated by frequency $fb$ and further pulse modulated at frequency $\pm (fb-fp)$ which, in this instance, is 1 kc./s.

Reverting now to point AP, the detector circuit 33, like that of the equivalent circuit 26 at point B, is of linear or quadratic type and in addition to its input derived from the associated modulated wave generator 11 it is supplied with the wave received through wave receiver 31 from point B, i.e. at frequency $fc1$ frequency modulated by $fb$ and further pulse modulated at 1 kc./s. The combination wave output from the detector circuit 33 which includes the component of frequency $\pm (fc-fc1)$ amplitude modulated by $\pm (fb-fp)$, is fed to filter circuits 71 arranged to select such frequency component whereby the resultant output from such filter circuit is now an isolated wave of frequency $\pm (fc-fc1)$ amplitude modulated by the frequency $\pm (fb-fp)$. With the numerical examples given, this will again be a wave of frequency 33 mc./s., amplitude modulated at 1 kc./s. This output wave is applied to an amplitude detector circuit 72 which is adapted to extract the $\pm (fb-fp)$, i.e. 1 kc./s., modulation component which is then employed as a controlling input for circular time base generator means 73 supplying the necessary output beam deflection voltages or currents to a cathode ray tube 40 arranged as the phase indicator means. The output from filter circuit 71 is also applied to a frequency discriminator 74 which is arranged to extract the 1 kc./s. pulse modulation component of the wave received from point B and this is applied to a suitable electrode of the cathode ray tube 40 to produce an appropriate display on he tube face. For example, such pulse may be arranged to cause a radial excursion of the tube beam either inwards or outwards from its normal circular path or, alternatively, the intensity of the beam may be modulated by the received pulse.

As an alternative to pulse modulating the phase-change signal $\pm (fb-fp)$ obtained from the detector circuit 63 upon the carrier $fc1$ in the modulated wave generator 22, such signal may be frequency modulated upon the carrier wave directly in its sinusoidal form.

The arrangement illustrated is particularly useful as a distance measuring device for survey and like purposes. By suitable choice (in a well known manner) of the first and second wave frequencies $fp$ and $fb$ from a number of different available frequencies, a variety of phase patterns can be provided based, for instance, upon frequencies having a relationship whereby the transit time can be evaluated in steps of progressively increased accuracy and the distance AP to B calculated therefrom.

It will be understood that with the arrangements just described, the point P need not coincide with point A. If such points are separated the first wave generator 10, the modulated wave generator 11 and the wave transmitter 12 constitute the equipment at point A and the remainder, the equipment at point P with, in addition a suitable further wave receiver for receiving the wave $fc$ frequency modulated by $fp$, as radiated from point A, and supplying such wave to the detector 33.

I claim:
1. A system for providing a relative measure of the distance between first and second points comprising means for generating an independent measuring frequency at each of the first and second points, means for modulating each of the measuring frequencies on respective carrier waves at each point to produce first and second modulated waves, means for transmitting the first modulated wave from the first point, means for receiving the first modulated wave at the second point, means for heterodyning the first modulated wave with the second modulated carrier wave at the second point to derive a first comparison frequency, means to modulate the first comparison frequency on the second modulated wave, means to transmit the doubly modulated second wave from the second point, means for receiving the second modulated wave at the first point, means to heterodyne the second modulated wave with the first modulated wave at the first point to derive a second comparison frequency, means to recover the first comparison frequency from the second wave, and means to compare the phases of the comparison frequencies at the first point.

2. The system claimed in claim 1 in which the means for modulating the measuring frequencies is means to frequency modulate the comparison frequencies on a carrier wave at each point and in which the means for deriving the comparison frequencies comprise detectors which detect the comparison frequencies as the amplitude modulation of the difference frequency between the carrier frequencies and comprise means to demodulate the difference frequency to produce the comparison frequencies.

3. The system claimed in claim 2 including means at the second point to frequency modulate the first comparison frequency upon the second carrier wave, and means at the first point to recover the first comparison frequency by means of a frequency discrimination of the difference frequency of the carriers.

4. The system claimed in claim 3 including means at the second point to convert the first comparison frequency into the form of a recurrent pulse.

5. A system for use in surveying the distance between points, comprising means at the first point for generating a first measuring frequency, means at the first point for frequency modulating the first measuring frequency on a first carrier wave, means for transmitting the first modulated carrier wave from the first point to the second point, means at the second point for receiving the first modulated wave, means at the second point for generating a second measuring frequency, means at the second point to modulate the second measuring frequency and a first comparison frequency on a second carrier wave, a heterodyne detector at the second point to derive the first comparison frequency from the modulated wave received from the first point and the modulated carrier wave at the second point as the difference frequency of the measuring frequencies and an amplitude modulation of the difference frequency between the carrier frequencies, filter means to select the modulated carrier difference frequency, an amplitude detector to derive the first comparison frequency, a pulse forming circuit fed from the amplitude detector, the modulation means at the second point having means for frequency modulating the second measuring frequency on the carrier wave and a pulse modulation input fed by the pulse forming circuit, means at the second point for transmitting the second modulated carrier wave to the first point, means at the first point for receiving the second modulated carrier wave, a heterodyne detector at the first point supplied with the first modulated wave at the first point and the second carrier wave received from the second point, second filter means on the output of the heterodyne detector at the first point to select the component comprising the difference frequency between the carrier frequencies amplitude modulated by the difference frequency of the measuring waves, an amplitude detector at the first point to derive the difference frequency of the measuring waves from the second filter output, a circular time base generator fed by the amplitude detector, a cathode ray deflector the output beam deflection of which is provided by the time base generator, a frequency discriminator to extract the pulse modulation of the second carrier wave from the second filter output and a connection between the discriminator and an electrode of the cathode ray deflector.

References Cited in the file of this patent

UNITED STATES PATENTS

| | | |
|---|---|---|
| 2,470,787 | Nosker | May 24, 1949 |
| 2,709,253 | Haywood | May 24, 1955 |
| 2,742,638 | Haywood | Apr. 17, 1956 |
| 2,763,857 | Valley | Sept. 18, 1956 |
| 2,779,018 | Gregoire et al. | Jan. 22, 1957 |